United States Patent
Motono et al.

(10) Patent No.: US 6,798,448 B1
(45) Date of Patent: Sep. 28, 2004

(54) IMAGING APPARATUS

(75) Inventors: Chihiro Motono, Saitama (JP); Koji Okumoto, Tokyo (JP); Toshitaka Yoshihiro, Kanagawa (JP); Masaya Nakatani, Tokyo (JP); Masatoshi Sase, Kanagawa (JP); Hidehiko Teshirogi, Kanagawa (JP); Seishin Asato, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/358,160

(22) Filed: Jul. 20, 1999

(30) Foreign Application Priority Data

Jul. 22, 1998 (JP) ............................................ 10-206954

(51) Int. Cl.⁷ ........................ H04N 5/228; H04N 5/225; H04N 3/14; H04N 9/79
(52) U.S. Cl. ................. 348/222.1; 348/312; 348/220.1; 386/40; 386/124
(58) Field of Search ................................ 348/305, 312, 348/317, 230.1, 220.1, 222.1, 231.6; 386/21, 40, 116, 124; 360/32

(56) References Cited

U.S. PATENT DOCUMENTS

| | | | | |
|---|---|---|---|---|
| 5,231,500 A | * | 7/1993 | Miyaji et al. ............. | 348/220.1 |
| 5,264,939 A | * | 11/1993 | Chang ....................... | 348/322 |
| 5,838,373 A | * | 11/1998 | Hasegawa et al. .......... | 348/312 |
| 5,841,471 A | * | 11/1998 | Endsley et al. .......... | 348/231.6 |
| 5,982,984 A | * | 11/1999 | Inuiya ..................... | 348/220.1 |
| 6,011,583 A | * | 1/2000 | Hieda et al. ............. | 348/220.1 |
| 6,124,888 A | * | 9/2000 | Terada et al. ............... | 348/302 |
| 6,356,306 B1 | * | 3/2002 | Kobayashi ................... | 348/322 |
| 6,377,301 B1 | * | 4/2002 | Hieda ..................... | 348/231.99 |
| 6,515,703 B1 | * | 2/2003 | Suzuki et al. ............... | 348/317 |
| 6,519,000 B1 | * | 2/2003 | Udagawa ................. | 348/220.1 |

* cited by examiner

*Primary Examiner*—Andrew Christensen
*Assistant Examiner*—Nhan T. Tran
(74) *Attorney, Agent, or Firm*—Frommer Lawrence & Haug LLP; William S. Frommer; Darren A. Simon

(57) ABSTRACT

An imaging apparatus can obtain a high quality still picture imaging signal in the all pixels read out mode and output it by means of an output processing means adapted to the interlaced read out mode. The imaging signal read out from a CCD image sensor 23 in the interlaced read out mode is directly supplied to a DV recording/reproducing processing section 4 by way of a camera signal processing circuit 24. The imaging signal read out from said CCD image sensor 23 in the apparatus is converted into an interlaced signal by a scan conversion section 3A, which is then supplied to the DV recording/reproducing processing section 4.

4 Claims, 14 Drawing Sheets

IMAGING APPARATUS

BACKGROUND OF THE INVENTION

1. Field of the Invention

This invention relates to an imaging apparatus comprising a solid image sensor adapted to be switched from the interlaced read out mode to the all pixels progressive read out mode or vice versa for imaging operations.

2. Related Background Art

Known imaging apparatus conforming to the established television standards such as the NTSC (National Television Systems Committee) standards or the PAL (Phase Alternation by Link) standards are adapted to obtain an imaging signal and output it as video signal conforming to specific set of television standards. A so-called cam-corder such as a video cassette recorder (VCR) or a video tape recorder (VTR) that is integral with a camera deal with a moving picture in the form of a video signal generated from an interlaced imaging signal and conforming to the specific television standards. When dealing with a still picture by the cam-corder, the interlaced signal is converted into a progressive scan signal for recording/reproducing the still image because a frame of picture is formed by two fields for the imaging signal obtained by an interlaced read out operation and the time lag between the two fields can degrade the picture.

With an electronic still camera exclusively designed for taking still pictures, a high image quality still picture imaging signal is obtained from the solid image sensor thereof that is adapted to progressive scanning by an all pixels progressive read out operation and then recorded on a recording medium.

SUMMARY OF THE INVENTION.

However, known cam-corders are only adapted to the interlaced read out mode and hence cannot obtain an imaging signal adapted to both the interlaced read out mode and the all pixels progressive read out mode (hereinafter referred to as the all pixels read out mode).

Therefore, it is an object of the present invention to provide an imaging apparatus adapted to be switched from the interlaced read out mode to the all pixels read out mode or vice versa for taking a still picture or a moving picture.

Another object of the present invention is to provide an imaging apparatus that is free from producing a jittering or otherwise disturbed picture as imaged output when switching from the interlaced read out mode to the all pixels read out mode or vice versa for operation.

Still another object of the present invention is to provide an imaging apparatus that is free from producing a jittering or otherwise disturbed picture as imaged output when switching from a mode of operation to another.

A further object of the present invention is to provide an imaging apparatus that is free from discrepancy between a still picture taken in the all pixels read out mode and a corresponding picture output for display.

According to the invention, the above objects are achieved by providing an imaging apparatus comprising a solid image sensor adapted to be switched from the interlaced read out mode to the all pixels read out mode or vice versa for outputting an imaging signal, an imaging signal processing means fed with the imaging signal from said solid image sensor, a scan conversion means for converting the imaging signal read out from said solid image sensor in the all pixels read out mode into an interlaced signal, an output signal processing means fed with the imaging signal from said imaging signal processing means or said scan conversion means and a control means for controlling the mode of operation of said solid image sensor and the operation of switching the input to said output signal processing means, the imaging signal read out from said solid image sensor in the interlaced read out mode being fed to the output signal processing means by way of the imaging signal processing means without any processing operation, the imaging signal read out from said solid image sensor in the all pixels read out mode being converted into an interlaced signal by said scan conversion means before being fed to said output signal processing means.

In an imaging apparatus according to the invention, preferably, said scan conversion means has a first memory means for storing the imaging signal read out from said solid image sensor in the all pixels read out mode and converts the imaging signal into an interlaced signal by way of said first memory means.

In an imaging apparatus according to the invention, preferably, said output signal processing means has a second memory means for storing the supplied imaging signal and outputs the imaging signal stored in the second memory means.

In an imaging apparatus according to the invention, preferably, said control means is adapted to control said output signal processing means at the time of switching the mode of operation of said solid image sensor from the interlaced read out mode to the all pixels read out mode so as to make it store the imaging signal immediately before the switching operation into said second memory means as output.

Preferably, an imaging apparatus according to the invention further comprises a still picture recording means for recording the imaging signal stored in said first memory means as still picture on a removable recording medium, said control means controlling the operation of writing an imaging signal in or reading it out from said first and second memory means so as to make the imaging signal to be recorded by said still picture recording means by way of said first memory means and the imaging signal stored in said second memory means as output by said output signal processing means agree with each other when recording the still picture by said still picture recording means.

Thus, in an imaging apparatus according to the invention, the solid image sensor is adapted to be switched from the interlaced read out mode to the all pixels read out mode or vice versa and the imaging output from the solid image sensor is processed by the common imaging signal processing means. Then, the imaging signal is output from the imaging signal processing means directly by way of the output signal processing means if it is read out in the interlaced read out mode, whereas the imaging signal is converted into an interlaced signal by the scan conversion means, which is subsequently output by way of the output signal processing means, if it is read out in the all pixels read out mode. Thus, the mode of operation of the solid image sensor is appropriately switched from the interlaced read out mode to the all pixels read out mode or vice versa for imaging and the obtained imaging signal is output by way of the output signal processing means that is particularly adapted to the interlaced read out mode.

Additionally, in an imaging apparatus according to the invention, preferably, said scan conversion means has a first memory means for storing the imaging signal read out from said solid image sensor in the all pixels read out mode. Then, it converts the imaging signal into an interlaced signal by way of said first memory means.

Still additionally, in an imaging apparatus according to the invention, preferably, said output signal processing means has a second memory means for storing the supplied imaging signal. Then, it outputs the imaging signal stored by way of the second memory means. Therefore, for example, when the mode of operation of said solid image sensor is switched from the interlaced read out mode to the all pixels read out mode, the imaging signal of the picture immediately before the switching operation can be stored in the second memory means as output in order to prevent the apparatus from producing a jittering or otherwise disturbed picture as imaged output at the time of switching the mode of operation.

Furthermore, an imaging apparatus according to the invention preferably also comprises a still picture recording means for recording the imaging signal stored in said first memory means as still picture on a removable recording medium. Then, said control means controls the operation of writing an imaging signal in or reading it out from said first and second memory means so as to make the imaging signal to be recorded by said still picture recording means by way of said first memory means and the imaging signal stored in said second memory means as output by said output signal processing means agree with each other when recording the still picture by said still picture recording means.

DESCRIPTION OF THE PREFERRED EMBODIMENTS

Now, the present invention is described in greater detail by referring to the accompanying drawings that illustrate preferred embodiments of the invention.

Figure 1:
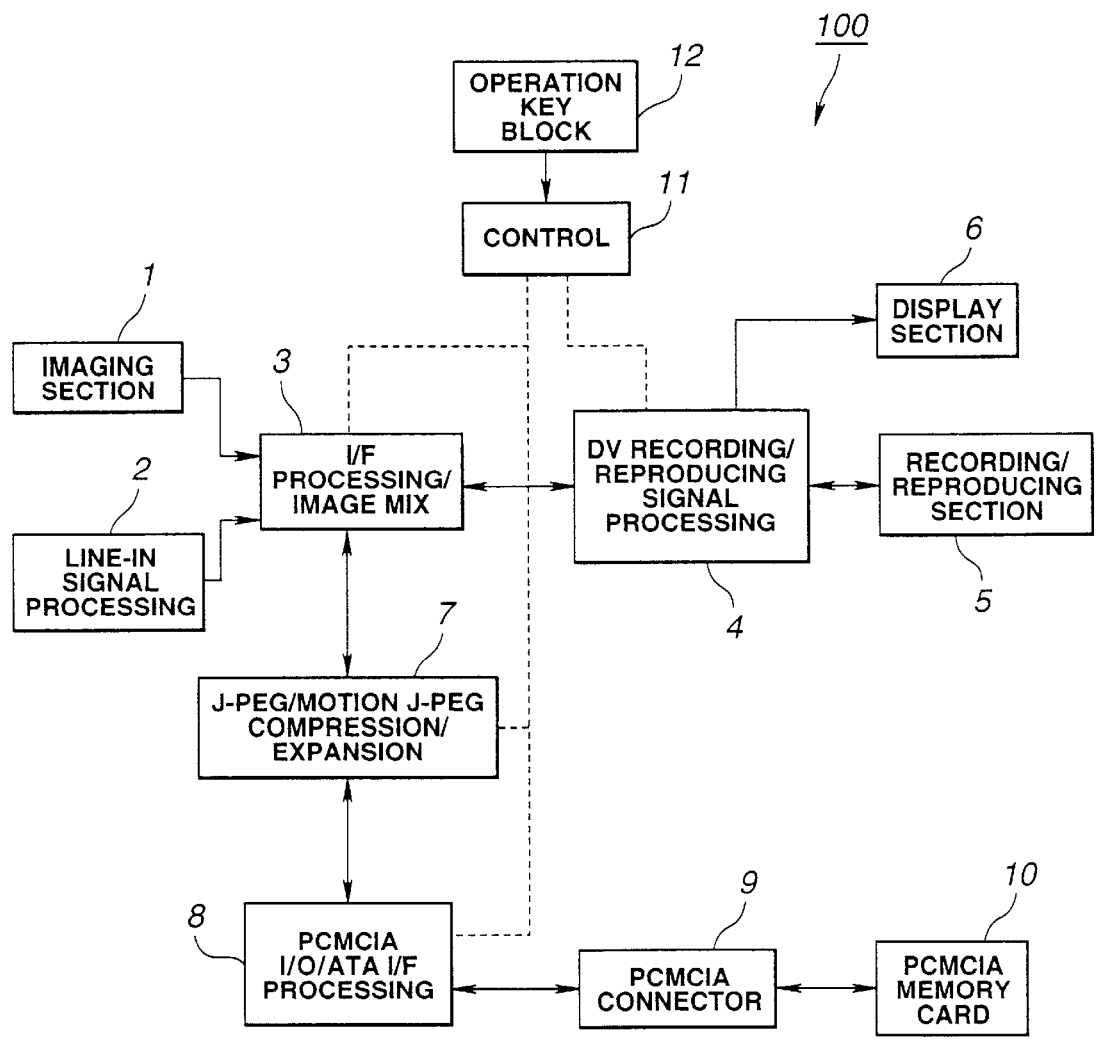
FIG. 1 is a schematic block diagram of a cam-corder realized by applying the present invention.

The present invention can typically be applied to a cam-corder 100 having a system configuration as illustrated in FIG. 1. Referring to FIG. 1, the cam-corder 100 comprises an imaging section 1, a line-in signal processing circuit 2, an I/F processing picture MIX circuit 3 fed with picture signals from the imaging section 1 and the line-in signal processing circuit 2, a recording/reproducing section 5, a display section 6, said recording/reproducing section 5 and said display section being connected to the I/F processing picture MIX circuit 3 by way of a DV recording/reproducing signal processing circuit 4, an I/F processing circuit 8 connected to said I/F processing-picture MIX circuit 3 by way of a compression/expansion circuit 7, a PCMCIA memory card 10 removable arranged and connected to said I/F processing circuit 8 by way of a PCMCIA connector 9, a control section 11 for controlling these components and an operation block 12 connected to the control section 11.

Figure 2:
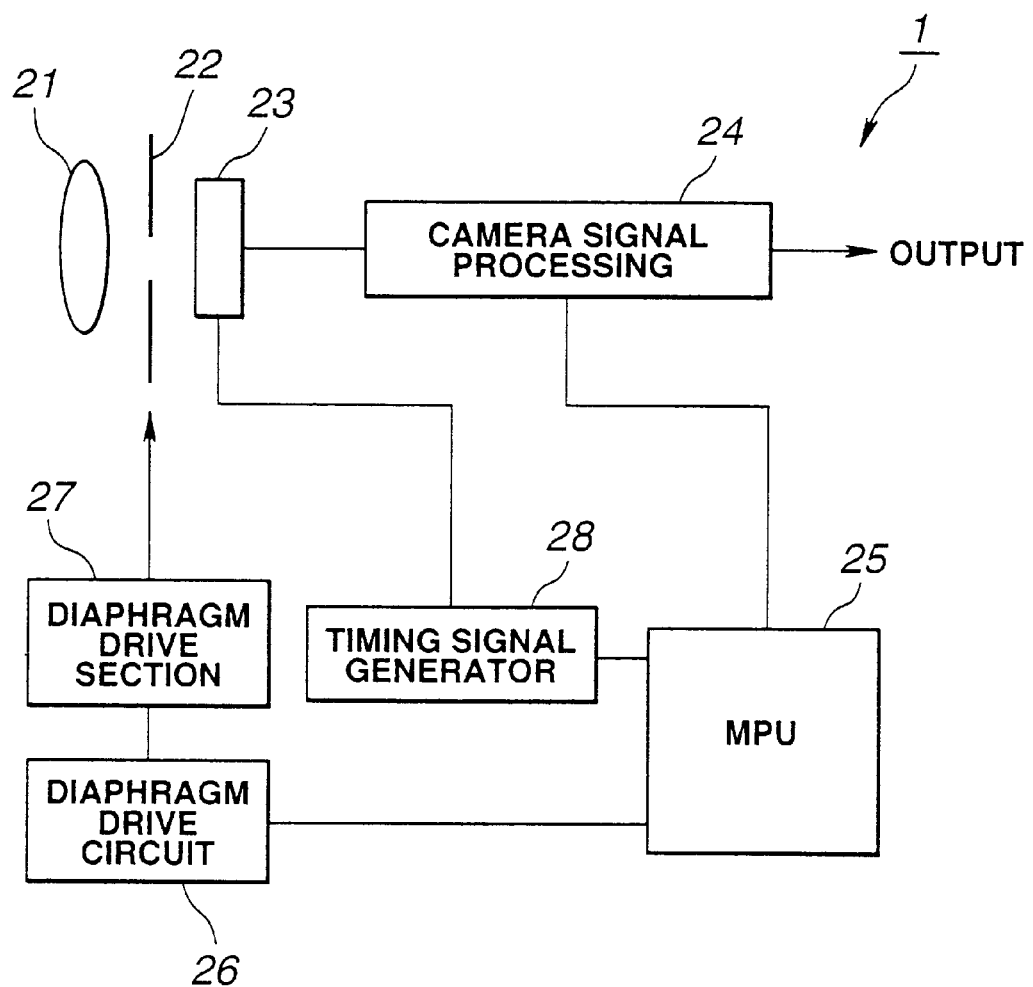
FIG. 2 is a schematic block diagram of the imaging section of the cam-corder of FIG. 1.

As schematically shown in FIG. 2, said imaging section 1 has a CCD image sensor 23 for receiving imaging light arriving it by way of an imaging lens 21 provided with an diaphragm 22 and an imaging signal obtained as imaging output by the CCD image sensor 23 is actually output by way of a camera signal processing circuit 24.

Said diaphragm 22 is driven to operate by an diaphragm drive section 27 connected to an diaphragm drive circuit 26, to which diaphragm control signals are applied from a microcomputer 25 for camera control.

Said CCD image sensor 23 is driven to operate by various timing signals including sensor gate signals and transfer clocks applied thereto from a timing signal generator 28.

Said camera signal processing circuit 24 and said timing signal generator 28 are adapted to operate in different modes of operation that are switched from one to the other or vice versa by a control signal transmitted from said microcomputer 25 for camera control.

Figure 3:
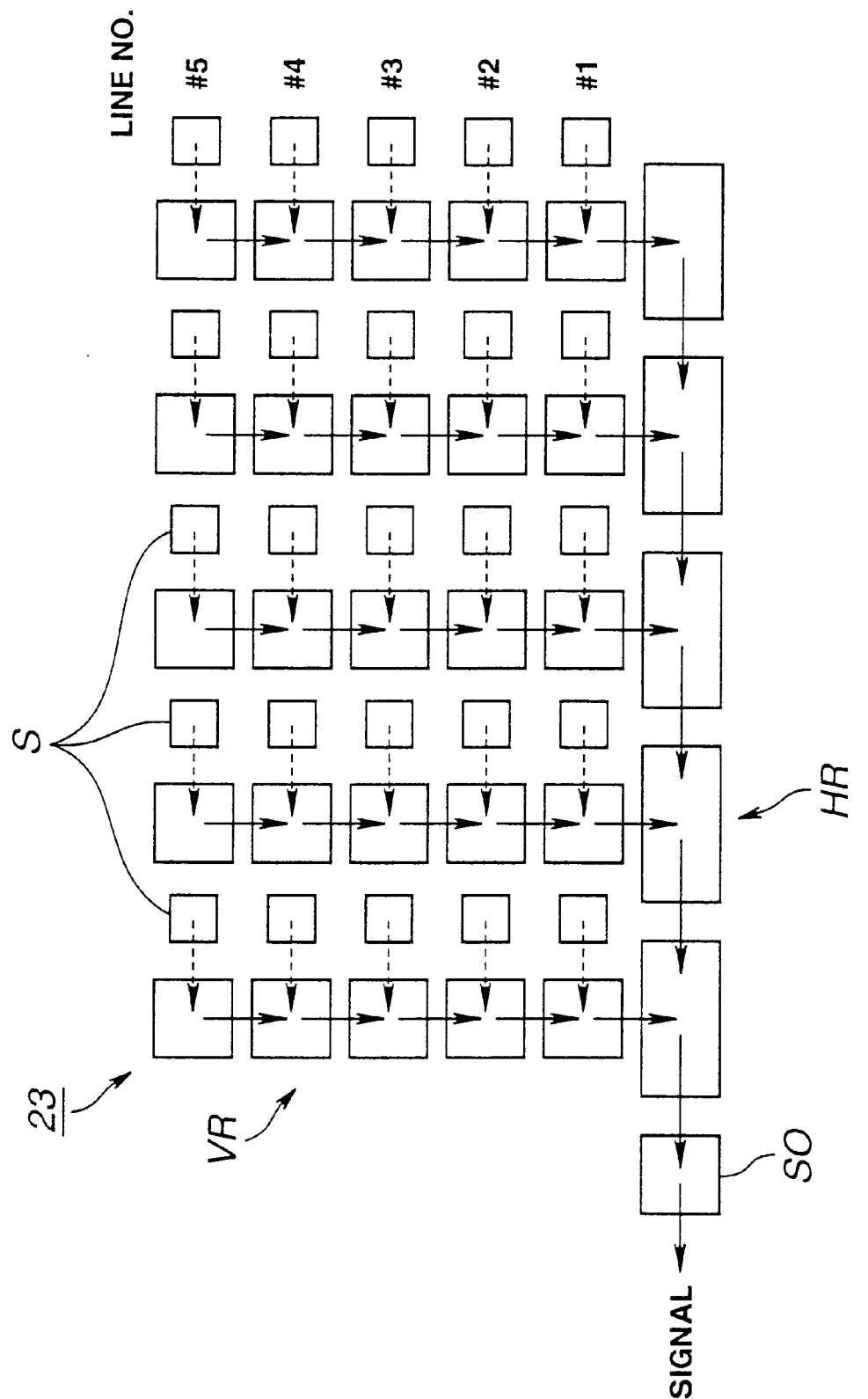
FIG. 3 is a schematic plan view of the CCD image sensor of said imaging section.

As schematically shown in FIG. 3, said CCD image sensor 23 comprises a number of photo sensors Ss arranged to form a matrix corresponding to pixels, vertical transfer registers VRs for reading out the imaging charges of the pixels obtained by the photo sensors Ss and horizontal transfer registers HRs for receiving the imaging charges of the pixels transferred thereto by way of said vertical transfer registers VRs, the imaging charges of the pixels being output as imaging signal for each horizontal line by said horizontal transfer registers HRs by way of output section SO. The CCD image sensor 23 is in principle a CCD imager of an all pixels read out type, where the number of the vertical transfer registers VRs is equal to the number of pixels on each horizontal line and each of the vertical transfer registers VRs has a number of transfer stages equal to the number of pixels on each vertical line.

Figure 4:
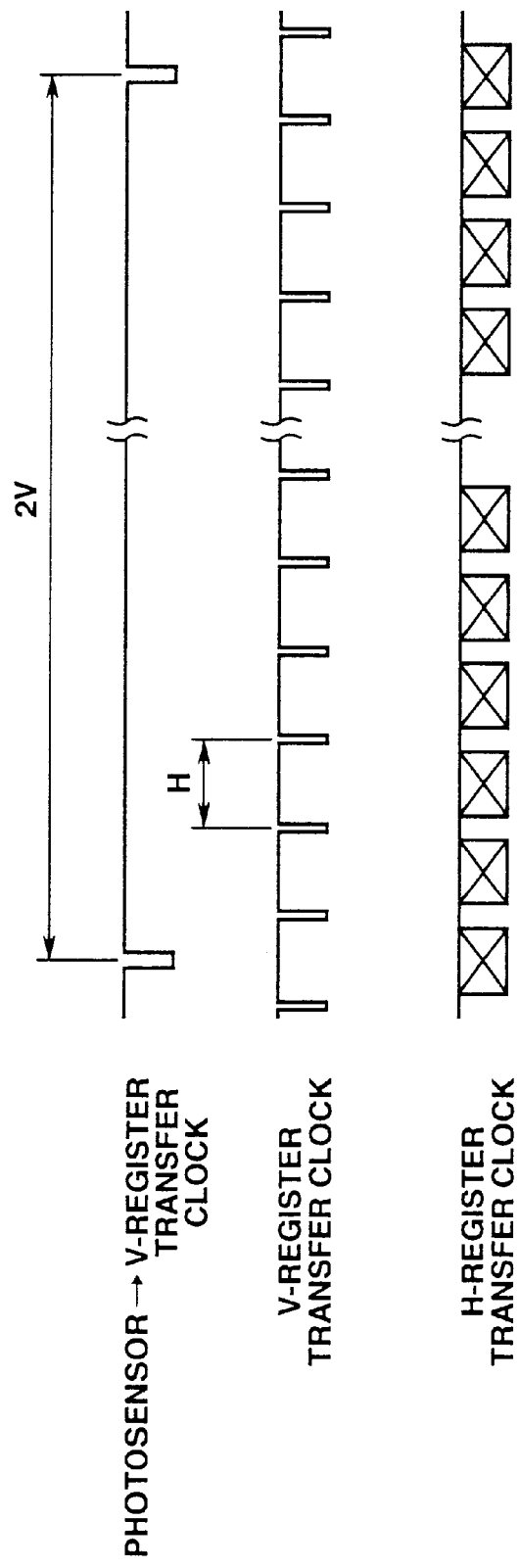
FIG. 4 is a timing chart for an imaging operation of said CCD image sensor in the all pixels read out mode.
Figure 5:
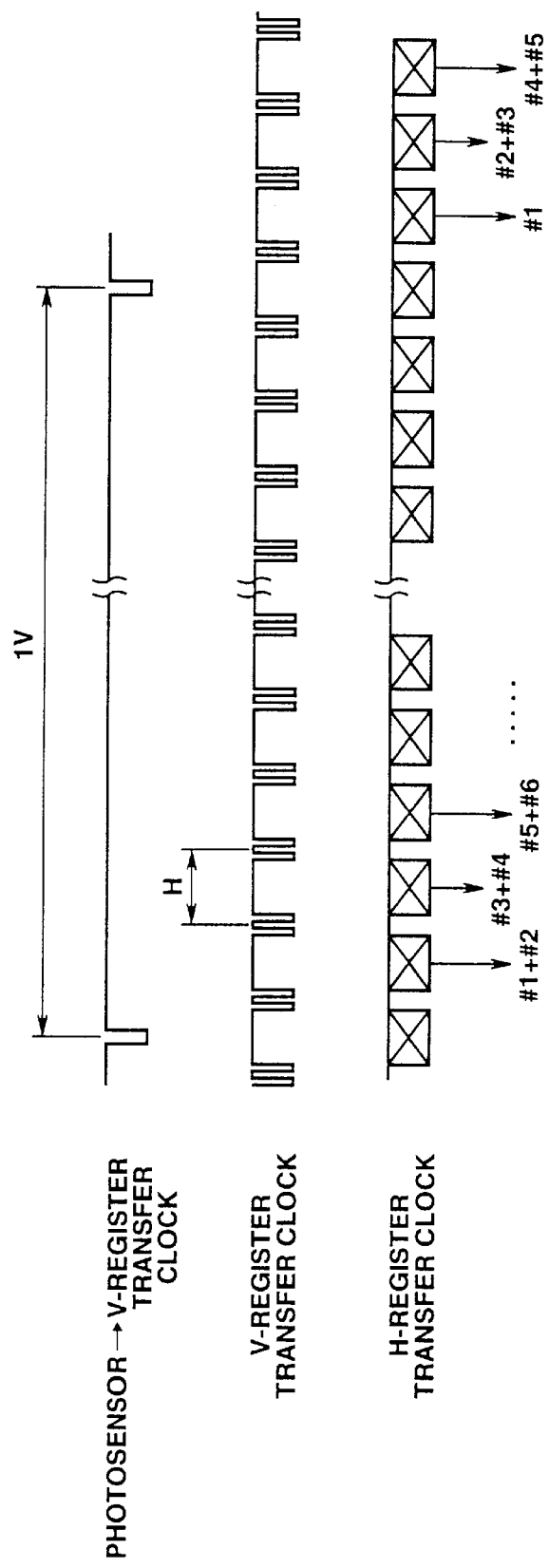
FIG. 5 is a timing chart for an imaging operation of said CCD image sensor in the interlaced read out mode.

When all the pixels read out mode is selected by the control signal from the microcomputer 25 for camera control, said timing signal generator 28 generates a sensor gate signal SG of 2 feeds (2Vs) or 1 frame (1F) period, a vertical transfer clock CKV of 1 horizontal scanning period (1H) and a horizontal transfer clock CKH with a frequency corresponding to the number of pixels on a horizontal line and drives said CCD image sensor 23 in the all pixels read out mode as shown in FIG. 4.

More specifically, in the all pixels read out mode, the imaging charge of each of the pixels obtained by the corresponding one of the photo sensors Ss of said CCD image sensor 23 is read out to the corresponding vertical transfer register VR for each 2 feeds or 1 frame period (1F) and all the imaging charges of all the pixels read out to said vertical transfer registers VRs are transferred to the horizontal transfer registers HRs on a horizontal line by horizontal line basis for each horizontal scanning period (1H) so that the imaging charge of each of the pixels is output from said horizontal transfer register HR by way of the output section SO on a horizontal line by horizontal line basis. Then, the imaging signals of the horizontal lines can be obtained as progressive signal for the imaging charges of all the pixels in the sequence of #1, #2, #3, . . . .

When, on the other hand, the interlaced read out mode is selected by the control signal from the microcomputer 25 for camera control, said timing signal generator 28 generates a sensor gate signal SG of 1 feed period (1V), two consecutive vertical transfer clocks CKV of 1 horizontal scanning period (1H) and a horizontal transfer clock CKH with a frequency corresponding to the number of pixels on a horizontal line and drives said CCD image sensor 23 in the interlaced read out mode.

More specifically, in the interlaced read out mode, the imaging charge of each of the pixels obtained by the corresponding one of the photo sensors Ss of said CCD image sensor 23 is read out to the corresponding vertical transfer register VR for each 1 feed period (1V) and all the imaging charges of all the pixels read out to said vertical transfer registers VRs are transferred to the horizontal transfer registers HRs on a horizontal line by horizontal line basis for each horizontal scanning period (1H) so that the imaging charges of two adjacent pixels on a vertical line may be added by the corresponding horizontal transfer registers HR to produce an imaging charge formed by synthetically combining the two charges for the two horizontal liens. Then, the imaging charges of the pixels of the horizontal lines, the number of which is now reduced to ½ of the original number, are output as imaging signal from said horizontal transfer registers HRs on a line by line basis by way of the output section SO. The imaging signal is an interlaced signal obtained for the imaging charges of all the pixels. If two imaging charges of two adjacent pixels on a vertical line to be synthetically combined by the horizontal transfer registers HRs are differentiated between an odd field and an even field, an imaging signal formed by sequentially combining two horizontal lines of #1, #2 +3#, #4+#5, . . . will be produced for an odd field, whereas an imaging signal formed by sequentially combining two horizontal lines of #1+#2, #3+#4, . . . will be produced for an even field.

Then, in the cam-corder 100, said I/F processing picture MIX circuit 3 carries out an interface processing operation on the signals input from said imaging section 1 and said line-in signal processing circuit 2 and mixes the signals.

Figure 6:
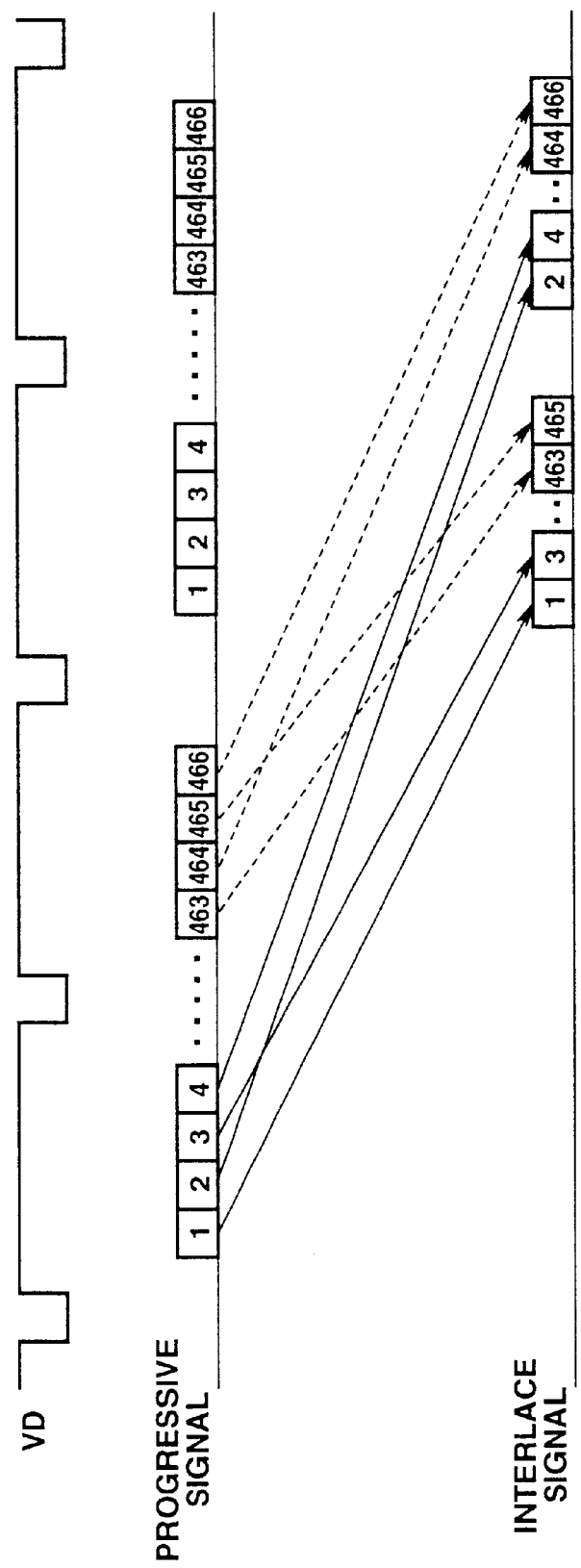
FIG. 6 is a timing chart for an operation of scan conversion of said cam-corder.

The mode of operation of said I/F processing picture MIX circuit 3 will be switched along with that of the CCD image sensor 23 of said imaging section 1 by said control section 11. In the all pixels read out mode, the imaging signal read out from the CCD image sensor 23 of said imaging section 1 is converted into an interlaced signal, which is then supplied to the DV recording/reproducing processing circuit 4 as shown in FIG. 6. In the interlaced read out mode, on the other hand, the imaging signal read out from the CCD image sensor 23 is directly fed to said DV recording/reproducing signal processing circuit 4.

Said DV recording/reproducing signal processing circuit 4 carries out a signal processing operation for recording/reproducing on information signals conforming to the so-called digital video (DV) standards. Said recording/reproducing section 5 records the information signals from the DV recording/reproducing signal processing circuit 4 on the recording medium and reproduces the specified information signals from said recording medium, which signals are then supplied to said DV recording/reproducing signal processing circuit 4. A magnetic tape adapted to record information signals on the tape in the form of residual magnetization will typically be used for said magnetic recording medium.

Said display section 6 displays the information signals being recorded or being reproduced by way of said DV recording/reproducing signal processing circuit 4.

Said compression/expansion circuit 7 is adapted to expand a coded picture of a still picture conforming to the JPEG (joint photographic expert group) standards or a moving picture conforming to the Motion JPEG standards or compress the picture signal of a still picture or a moving picture to a coded picture conforming to the appropriate one of said two sets of standards. The compression/expansion circuit 7 carries out the above processing operation on the picture signal or the coded picture from said I/F processing picture MIX circuit 3 or the PCMCIA I/O/ATA I/F processing circuit 8, whichever appropriate.

The PCMCIA I/O/ATA I/F 8 is a circuit for interfacing the JPEG/Motion JPEG compression/expansion circuit 8 and the PCMCIA memory card 10. The PCMCIA connector 12 is a connector conforming to the PCMCIA standards.

Figure 7:
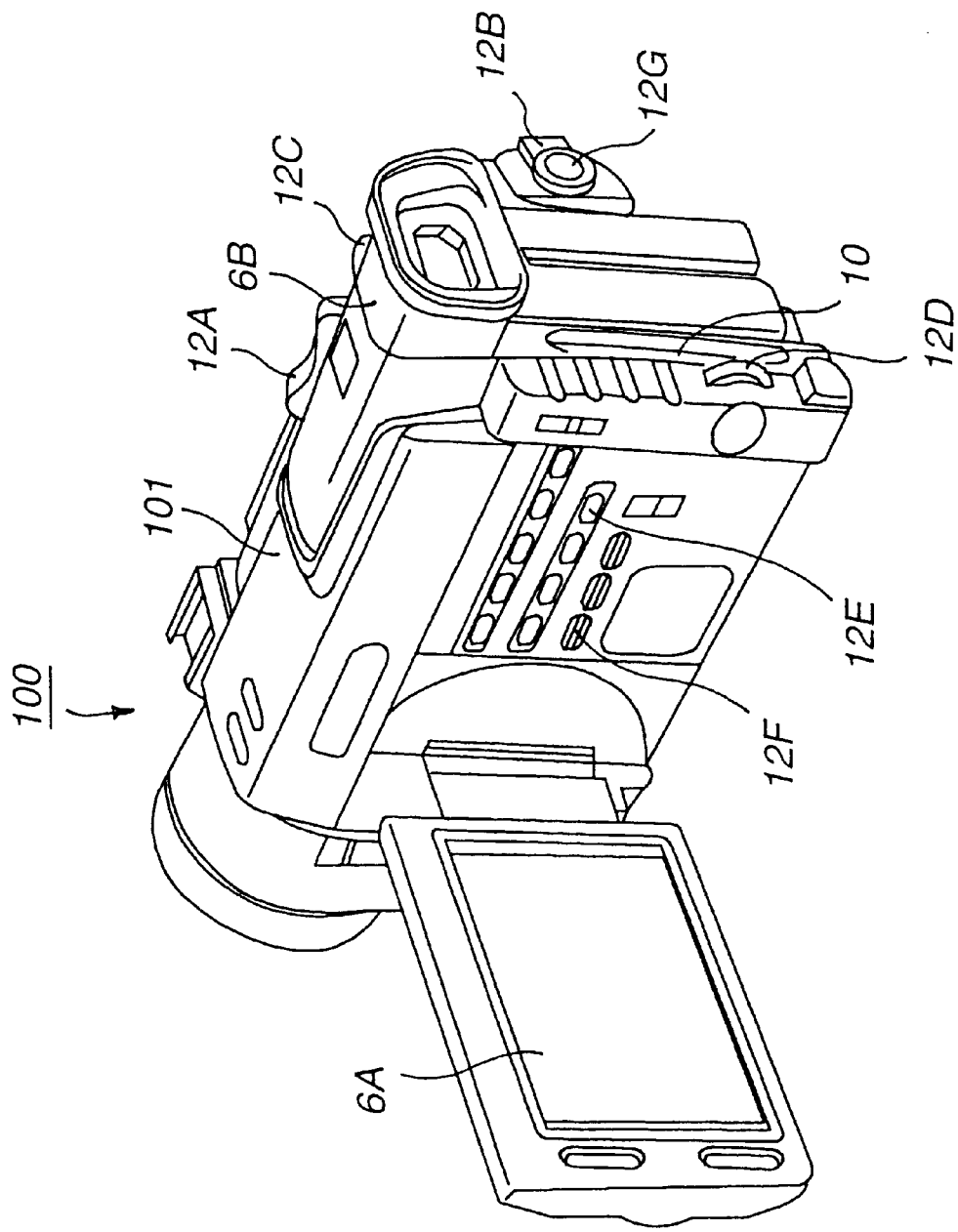
FIG. 7 is a schematic perspective view of the cam-corder of FIG. 1

As seen from the schematic perspective view of the camera main body 101 shown in FIG. 7, the cam-corder 100 is provided with a display section 6 including an electronic view finder 6A and a liquid crystal display panel 6B that are arranged on said camera main body 101 and also with an operation block 12 comprising a number of various selection buttons including a zoom control lever 12A, an operation mode switching lever 13B, a still picture imaging operation button 12C, a control dial 12D, a menu button 12E and a data code button 12F that are also arranged on the camera main body 101.

Said zoom control lever 12A applies a zooming operation input data representing the operated position of the lever to said control section 11. The control section 11 by turn controls the zoom drive section of the imaging lens 21 of the imaging section 1 according to said zooming operation input data.

Said operation mode switching lever 12B is provided with a total of four switching positions including:

position 1: VTR, position 2: off, position 3: CAM and position 4: memory and transmits an operation input data corresponding to the selected switching position to said control section 11. Said still picture imaging operation button 12C is a two-level button and an operation input data corresponding to the first level or the second level is sent to said control section 11. The control section 11 controls said imaging section 1, said I/F processing picture MIX circuit 3, said DV recording/reproducing signal processing circuit 4, said recording/reproducing section 5, said compression/expansion circuit and said I/F processing circuit 8 according to the operation input data in a manner as will be described below.

If said position 1 is selected by said operation mode switching lever 12B of the cam-corder 100, the control section 11 selects the VTR mode for the cam-corder 100. In the selected VTR mode, said control section 11 accepts an operation input entered by way of a VTR button (not shown) and controls said recording/reproducing section 5 according to the operation input. If, for instance, the replay button is operated, the control section 11 starts a replay operation by means of said recording/reproducing section 5.

If, on the other hand, said position 2 is selected by said operation mode switching lever 12B, the control section 11 deactivates the cam-corder 100.

If said position 3 is selected by said operation mode switching lever 12B, the control section 11 selects the camera mode for the cam-corder 100. Then, the control section 11 drives said imaging section 1 to make said display section 6, the electronic view finder 6A or the liquid crystal display panel 6B to be more accurate, display a picture of the imaging signal. Thereafter, upon receiving an operation input from the start/stop button 12G in a imaging standby sate, the control section 11 drives said recording/reproducing section 5 to start a recording operation. However, upon receiving another operation input from the start/stop button 12G, it terminates the current recording operation and makes the cam-corder 100 return to the standby state.

In the camera mode, said control section 11 accepts the operation input data transmitted thereto as a result of an operation of depressing said still picture imaging operation button 12C. If the operation input data is transmitted as a result of an operation of depressing said still picture imaging operation button 12C in the imaging standby state, the imaging signal obtained by said imaging section 1 is captured for a still picture, which still picture is then displayed on the display section 6, as said still picture imaging operation button 12C is depressed to the first level. However, as said still picture imaging operation button 12C is depressed further to the second level, said captured still picture is recorded for a predetermined time (7 seconds in the illustrated example) by said recording/reproducing section 5. Note that the captured sound is also recorded by said recording/reproducing section 5. If said still picture imaging operation button 12C is not depressed to the second level and released, the still picture currently being recorded by said recording/reproducing section 5 can be selected. If said still picture imaging operation button 12C is depressed when the camera is operating for recording pictures, the picture taken at the instant is recorded for the predetermined time (7 seconds in the illustrated example) by said recording/reproducing section 5 and the camera returns to the standby state after the end of the recording operation.

Additionally, said control section 11 selects the memory mode for the cam-corder 100 when said operation mode switching lever 12B is at the position 4.

In the memory mode, said control section 11 forcibly switches the mode of operation of said imaging section 1 to the all pixels read out mode. If the operation input data is transmitted as a result of an operation of depressing said still picture imaging operation button 12C in the memory mode, the imaging signal obtained as progressive scan signal by said imaging section 1 is captured and displayed on said display section 6 as said still picture imaging operation button 12C is depressed to the first level. Then, as said still picture imaging operation button 12C is depressed further to the second level, said captured still picture is recorded on said memory card 10. If said still picture imaging operation button 12C is not depressed to the second level and released, the still picture recorded on said memory card 10 can be selected for another time.

Figures 8, 9A, 9B:
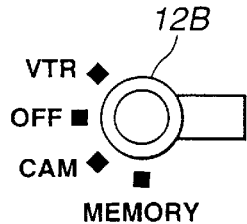
FIG. 8 is a schematic illustration of the operation switch lever of said cam-corder, showing the positional assignments of the various functions thereof.
FIGS. 9A and 9B are schematic illustration, showing how the all pixels read out mode is selected for said cam-corder when it is used as camera.
Figure 10:
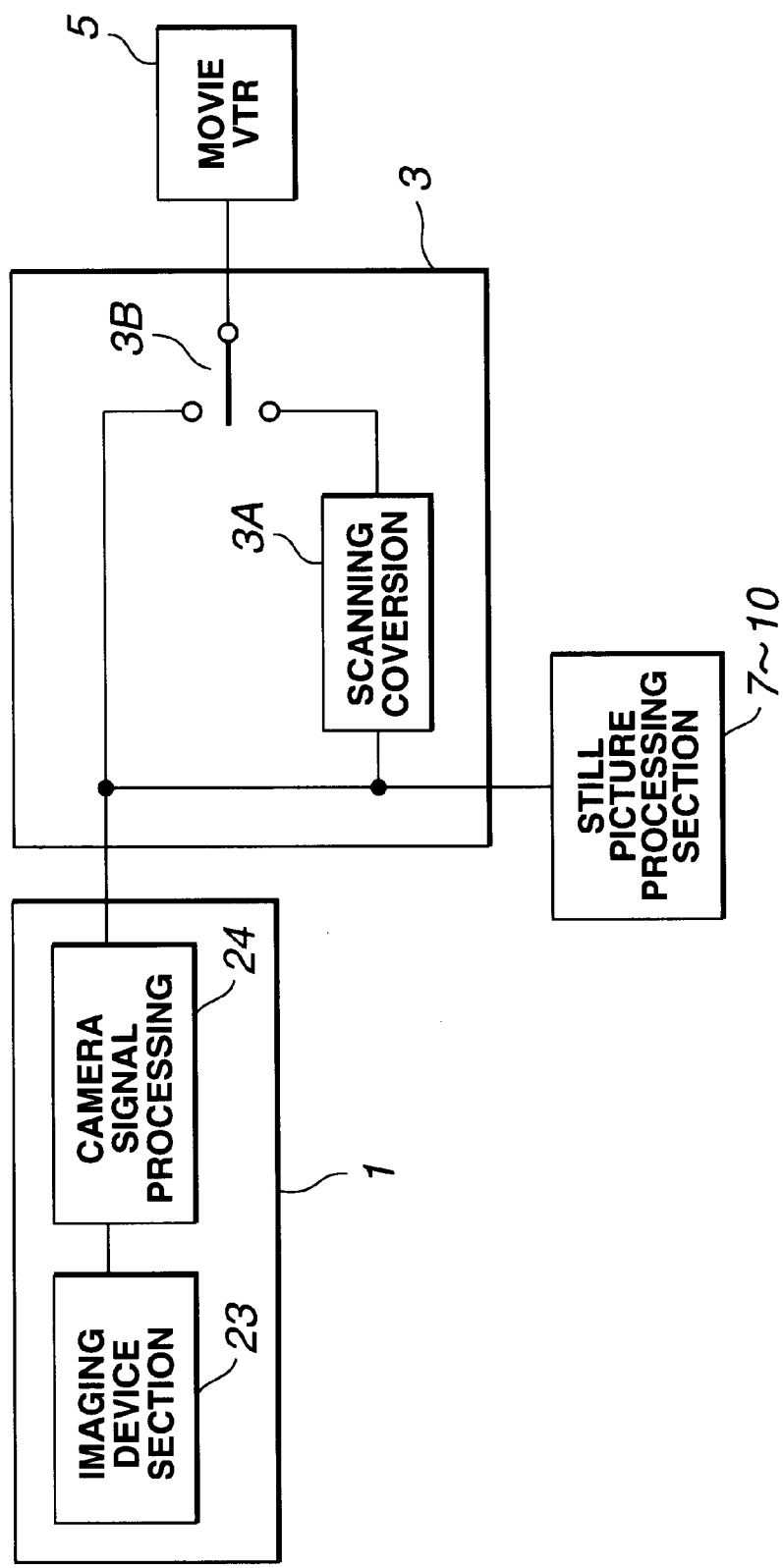
FIG. 10 is a schematic block diagram of said cam-corder, showing its principal components.

The selection of the all pixels read out mode in said camera mode can be realized by depressing the menu button 12E arranged on said camera main body 101 in the imaging standby state to display the menu on the display section 6 and turning the control dial 12D to switch the progressive from an "off" state to an "on" state as shown in FIGS. 9A and 9B.

With a cam-corder 100 having the above described configuration, the imaging signal obtained as progressive scan signal by the CCD image sensor 23 of said imaging section 1 in the all pixels read out mode cannot be displayed directly on the display section 6 adapted to operate for interlaced signals so that the progressive scan signal has to be converted into an interlaced signal by said I/F processing picture MIX circuit 3 before it is displayed on the input section 6. Additionally, with the cam-corder 100, the mode of operation of said imaging section 1 is switched to the all pixels read out mode in said camera mode for imaging operation and the high quality imaging signal obtained as progressive scan signal by the imaging section 1 is converted into an interlaced signal by said I/F processing picture MIX circuit 3, which signal is then recorded on a magnetic tape by said recording/reproducing section 5. Said recording/reproducing section 5 is practically not subjected to any limitations in terms of recording capacity because it is a recording means using a magnetic tap as recording medium so that still pictures represented by high quality imaging signals obtained by said imaging section 1 as progressive scan signals in the all pixels read out mode can be recorded continuously on the magnetic tape.

In other words, the cam-corder 100 comprises a CCD image sensor 23 adapted to output an imaging signal in either of the two modes of operation, the interlaced read out mode and the all pixels read out mode, a camera signal processing circuit 24 to be fed with the imaging signal from said CCD image sensor 23, a scan conversion section 3A for converting the imaging read out from said CCD image sensor 23 in the all pixels read out mode into an interlaced signal, a recording/reproducing section 5 for recording the imaging signal fed from said camera signal processing circuit 24 or said scan conversion section 3A on a recording medium and a switch 3B for switching the input to said recording/reproducing section 5 according to the mode of operation of said CCD image sensor 23, said recording/reproducing section 5 being adapted to record the imaging signal read out from said CCD image sensor 23 in the interlaced read out mode directly on the recording medium by way of the camera signal processing circuit 24 and convert the imaging signal read out from said CCD image sensor 23 in the all pixels read out mode into an interlaced signal by said scan conversion section 3A before recording it on the recording medium. Note that the function of said scan conversion section 3A and that of said switch 3B are realized by said I/F processing picture MIX circuit 3.

Figure 11:
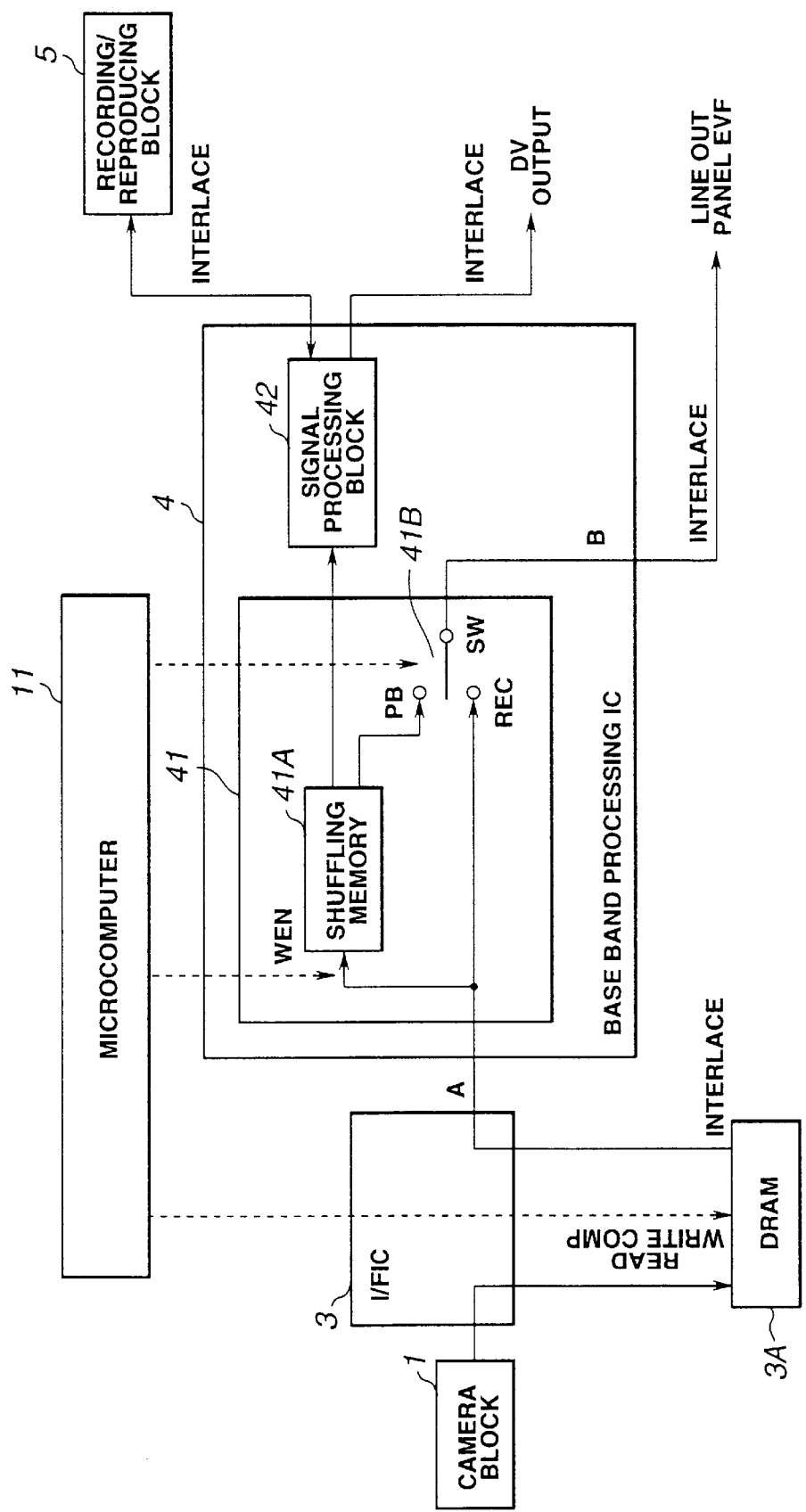
FIG. 11 is a schematic block diagram of said cam-corder, showing how an imaging signal flows in the all pixels read out mode.

FIG. 11 is a schematic block diagram of the cam-corder 100, showing how an imaging signal flows in the all pixels read out mode.

In the cam-corder 100, the I/F processing picture MIX circuit 3 that is fed with the imaging signal read out from the imaging section 1 in the all pixels read out mode takes in the imaging signal into memory (dynamic random access memory, DRAM) 3A as progressive scan signal for an operation of processing the still picture and controls the sequence of reading out the imaging signal from the memory 3A progressively on a line by line basis in order to convert the imaging signal from a progressive scan signal into an interlaced signal, which is then fed to the DV recording/reproducing processing section 4.

In other words, when the all pixels read out mode is selected, the control section 11 issues a read out request to said I/F processing picture MIX circuit 3 to make it read out the imaging signal from said memory 3A for an interlaced picture and also issues a write in request to the DV recording/reproducing signal processing section 4 to make it write the imaging signal in the shuffling memory 41A of the base band processing section 41 for the interlaced picture.

Said DV recording/reproducing signal processing section 4 carries out a shuffling processing operation on the imaging signal taken into the shuffling memory 41A of said base band processing section 41 and also a predetermined processing operation on the signal in the signal processing block 42 in order to convert it into a signal in the DV format, which signal is then supplied to the recording/reproducing section 5 and, at the same time, output as DV signal.

While the imaging signal is being read out from said memory 3A and written into said shuffling memory 41A, the switch 41B of said base band processing section 41 is switched to the REC side so that the picture is output to the line and/or said display section 6 by the imaging signal read out from said memory 3A.

Additionally, said control section 11 issues a write in request to said I/F processing picture MIX circuit 3 to make it write the imaging signal read out from said imaging section 1 in the all pixels read out mode into said memory 3A.

While the imaging signal read out from said imaging section 1 in the all pixels read out mode is being written into said memory 3A, the preceding imaging signal written into said shuffling memory 41A previously is held as the write enable request to the shuffling memory 41A of said base band processing section 41 is dropped. Then, the switch 41B of said base band processing section 41 is switched to the PB side so that the picture is output to the line and/or said display section 6 by said imaging signal held in said shuffling memory 41A. Additionally, the imaging signal shuffled by said shuffling memory 41A is converted into a signal in a DV format, which signal is then supplied to the recording/reproducing section 5 and also output as DV signal.

The cam-corder 100 repeats the above processing operations for each frame in the all pixels read out mode.

In the cam-corder 100, when said control section 11 switches the mode of operation of the imaging section 1 from the interlaced read out mode to the all pixels read out mode, it stores the imaging signal immediately before the switching in the shuffling memory 41A and controls the operation of outputting it to the line or to said display section 6. Thus, the displayed image is free from jittering or some other disturbance.

Figure 12:
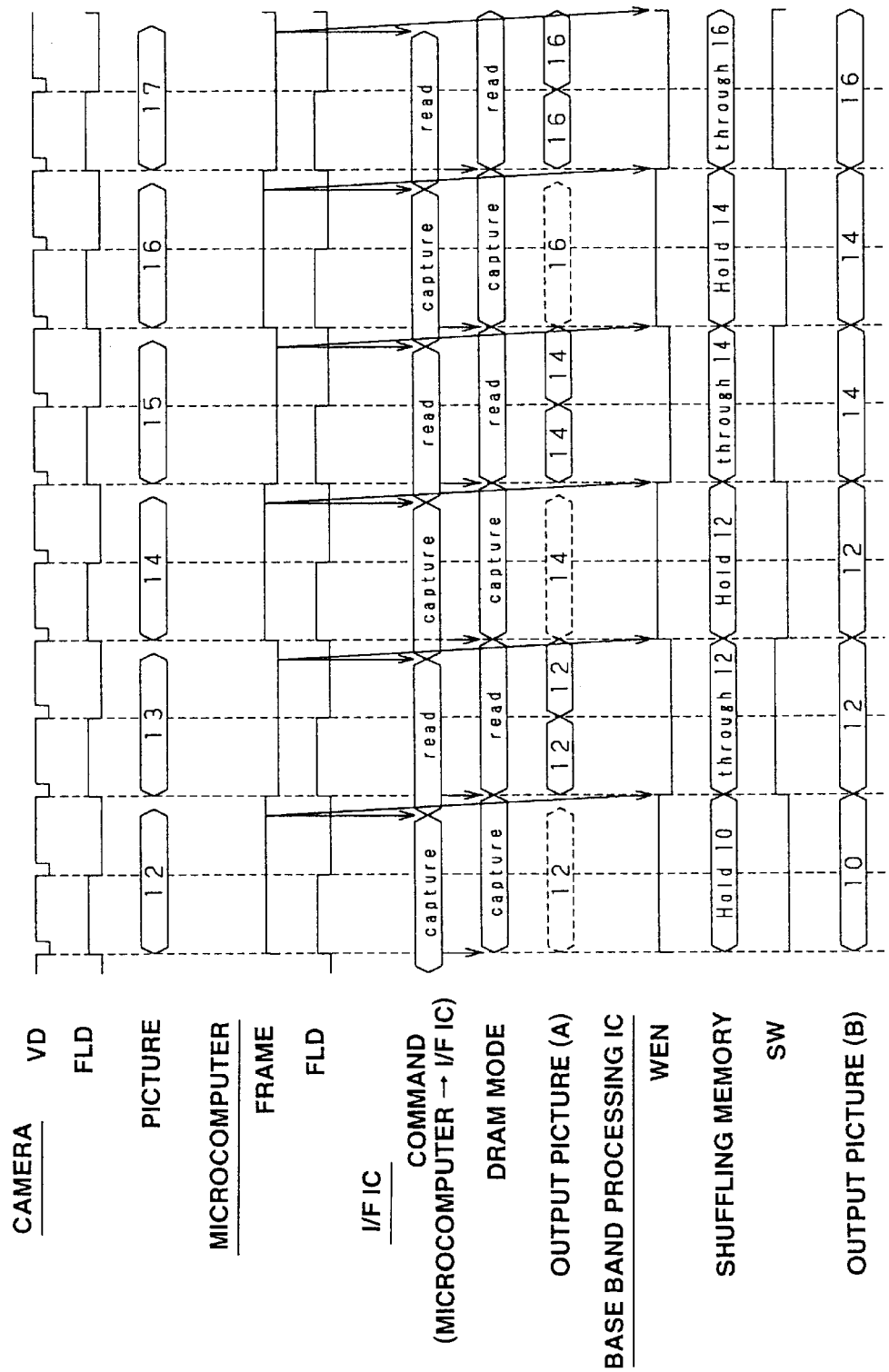
FIG. 12 is a timing chart for a steady state operation of said cam-corder in the all pixels read out mode.
Figure 13:
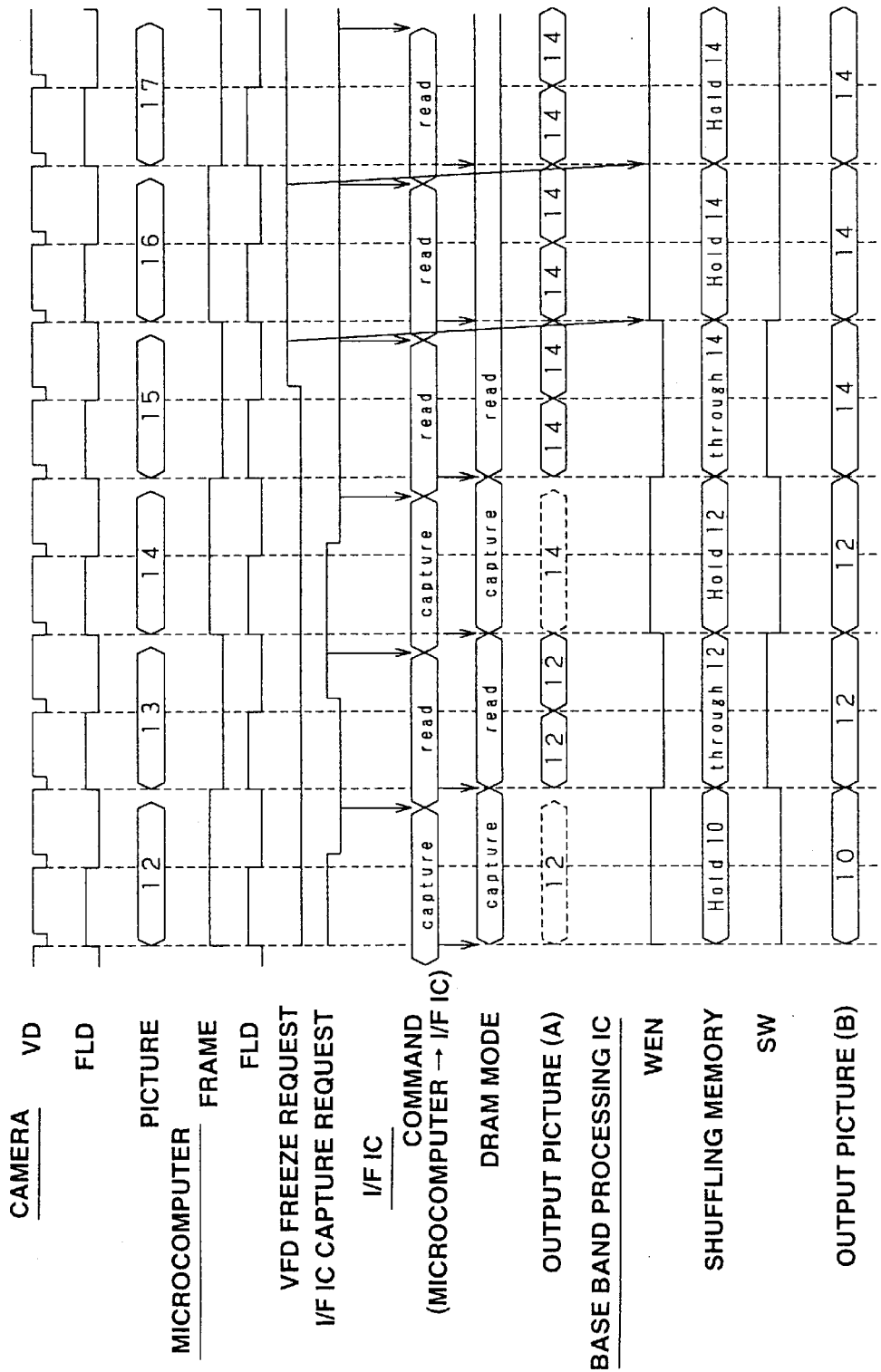
FIG. 13 is a timing chart for a frozen state operation of said cam-corder in the all pixels read out mode.

Additionally, in the cam-corder 100, the control section 11 controls the timings of various operations on the basis of the frame field signal synchronized with the picture obtained by the imaging section 1 as seen from the timing chart for a steady state operation in the all pixels read out mode illustrated in FIG. 12.

Then, the control section 11 controls the operation of writing an imaging signal into or reading it out from the memory 3A and the shuffling memory 41A by referring to said frame field signal so as to make the frozen picture that is the output picture B of said base band processing section 41 to allow the user to confirm the picture he or she has recorded and the output picture A of the imaging signal to be read out from the memory 3A and actually recorded agree with each other as seen from the timing chart for a frozen state in the all pixels read out mode.

Still additionally, when a long shutter operation is selected in the cam-corder 100, the control section 11 holds the current imaging signal in the shuffling memory 41A of said base band processing section 41 as long as the charge accumulating state of the CCD image sensor 23 of the imaging section 1 continues and updates the picture of said shuffling memory 41A each time a new imaging signal is read out from said CCD image sensor 23 in the interlaced read out mode.

Figure 14:
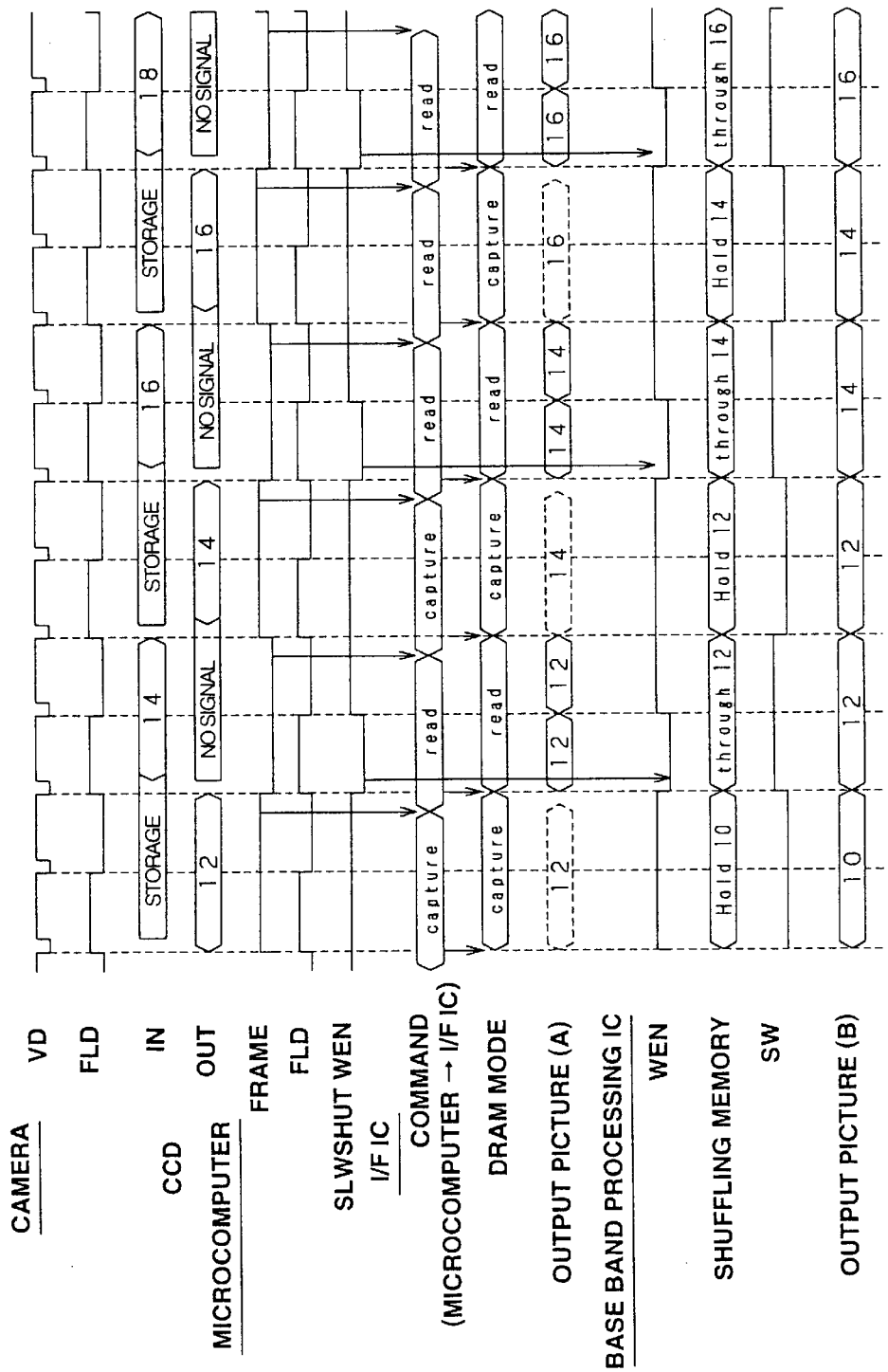
FIG. 14 is a timing chart for an imaging operation of said cam-corder in the all pixels read out mode when the slow shutter is activated.
Figure 15:
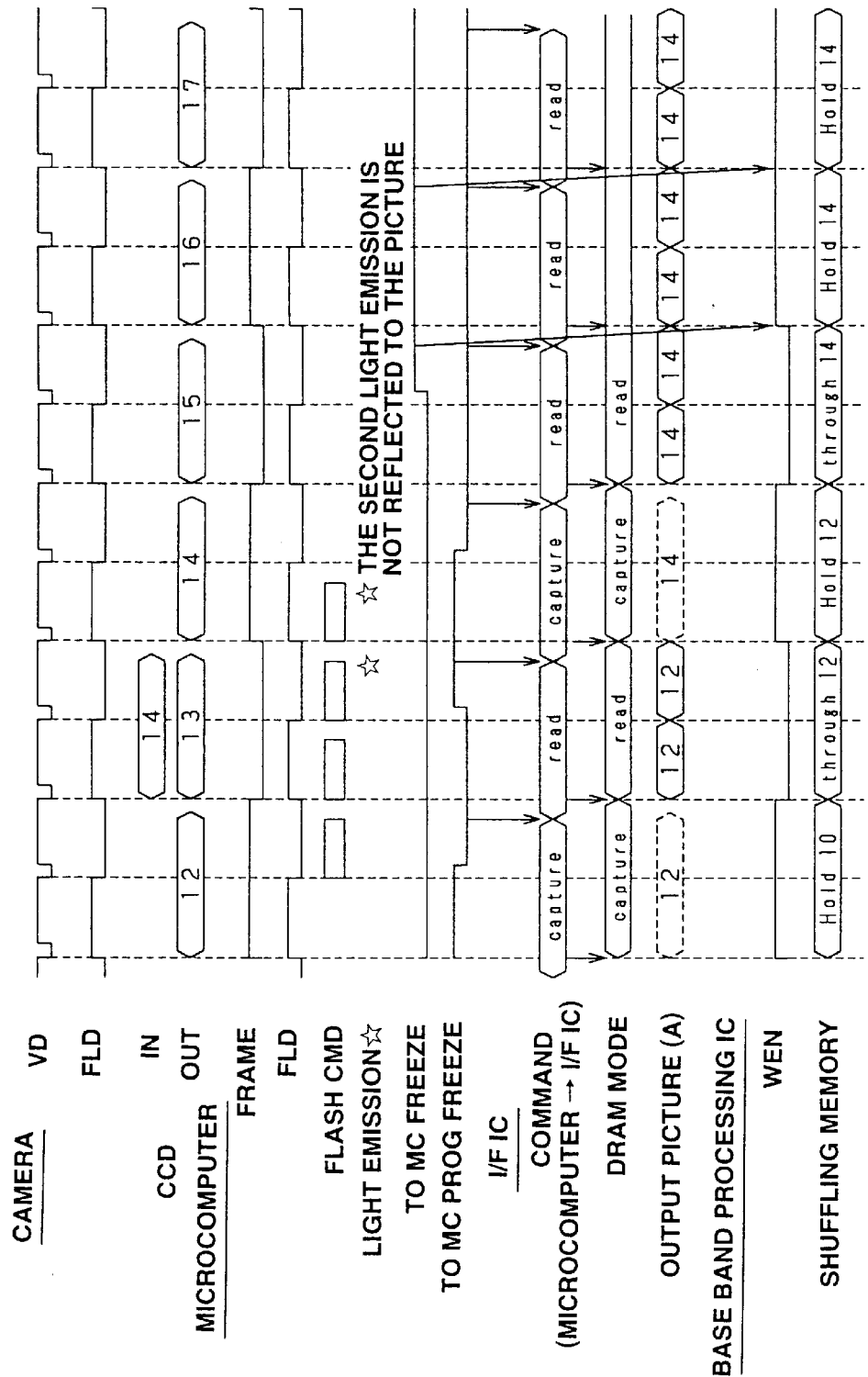
FIG. 15 is a timing chart for an imaging operation of said cam-corder in the all pixels read out mode when the strobe is activated to flash.

However, in the all pixels read out mode, no imaging signal can be read out from said memory 3A when an imaging signal is being written into the memory 3A so that a picture will be removed in a two-frame period. If the picture read out from said CCD image sensor 23 is the removed picture, then no imaging signal will be obtained. Therefore, as shown in FIG. 14, the read out picture is prevented from being thrown away by synchronizing the timing of reading out the picture from said CCD image sensor 23 and the phase of the field frame signal that is used as reference for all the pixels.

Finally, in the cam-corder 100, the externally connected strobe is made to emit light once in every field in synchronism with a vertical synchronizing signal and successively twice in response to a freezing request or a still picture recording request of the user. Then, in the all pixels read out mode, the strobe will emit light twice for a picture of a frame formed in the interlaced read out mode. Therefore, the control section 11 makes the timing of light emission of the strobe agree with the phase of the field frame signal that is used as reference for all the pixels in order to make the second light emission of the strobe ineffective. Thus, the obtained picture will be free from any disturbance that can be produced by the second light emission of the strobe.

Note that the reference numerals in FIGS. 12 through 15 denote the frame numbers that corresponds to the respective pictures.

What is claimed is:

1. An imaging apparatus having a camera mode for recording still pictures and a memory mode for recording moving pictures, comprising:

a solid state image sensor for outputting an imaging signal in an interlace scan mode or a progressive scan mode; the imaging signal being output in the interlace scan mode when the imaging apparatus is in the camera mode and output in either the interlace scan mode or the progressive scan mode when the imaging apparatus is in the memory mode;

an imaging signal processing means fed with the imaging signal from said solid state image sensor; wherein, if the imaging signal is in the progressive scan mode, the imaging signal processing means converts the imaging signal into the interlace scan mode by storing the imaging signal in a first memory and reading out the stored imaging signal on a line by line basis;

an output signal processing means for storing the imaging signal in the interlace scan mode from said imaging signal processing means in a second memory, switching a line out between the imaging signal from the imaging signal processing means and the imaging signal stored in the second memory, and converting the imaging signal from the second memory into an output signal by the output signal processing means; and a control means for controlling the mode of operation of said solid state image sensor, the storing of the imaging signal in the first memory and the output signal processing means.

2. The imaging apparatus according to claim 1, wherein said control means is adapted to control said output signal processing means at the time of switching the mode of operation of said solid state image sensor from the interlaced scan mode to the progressive scan mode so as to make the output signal processing means store the imaging signal immediately before the switching operation into said second memory as output.

3. The imaging apparatus according to claim 1, further comprising a still picture recording means for recording the imaging signal stored in said first memory as a still picture on a removable recording medium;

said control means controlling the operation of writing in or reading out said imaging signal from said first and second memories so as to make the imaging signal to be recorded by said still picture recording means by way of said first memory and the imaging signal stored in said shuffling memory as output by said output signal processing means agree with each other when recording the still picture by said still picture recording means.

4. The imaging apparatus according to claim 1, wherein an immediately preceding picture held in the second memory is output during a period when the imaging signal read out in the progressive scan mode is converted into the interlace scan mode.

* * * * *